United States Patent

Jan

[11] Patent Number: 5,850,371
[45] Date of Patent: Dec. 15, 1998

[54] WIDE ANGLE FREQUENCY AUTOMATIC SCANNING ULTRASONIC ANIMAL CHASER

[76] Inventor: Te-Chin Jan, 24F-1, No.161, Sungteh Rd., Taipei, Taiwan

[21] Appl. No.: 4,880

[22] Filed: Jan. 9, 1998

[51] Int. Cl.⁶ .................................................. A01M 29/02
[52] U.S. Cl. ............................................................. 367/139
[58] Field of Search ........................ 367/139; 340/384.2; 119/719; 116/22 A

[56] References Cited

U.S. PATENT DOCUMENTS 5,214,411   5/1993   Herbruck ................................. 367/139

Primary Examiner—Daniel T. Pihulic
Attorney, Agent, or Firm—W. Wayne Liauh

[57] ABSTRACT

A wide angle frequency automatic scanning ultrasonic animal chaser for scaring away straying cats and dogs includes a case, an end plate, a water resistant cover and an ultrasonic oscillation circuit held in the case. The case and the end plate are housed in the cover by means of ridges and troughs without using hand tools. The ultrasonic oscillation circuit includes a divider and a stable multivibrator circuit for generating ultrasonic oscillation frequency and emitting through a perforated plate located at a front end of the case. The oscillation circuit provides an automatic scanning frequency function to effectively scare away straying cats and dogs nearby. This device consumes little power and is easy to install and use.

1 Claim, 5 Drawing Sheets

WIDE ANGLE FREQUENCY AUTOMATIC SCANNING ULTRASONIC ANIMAL CHASER

BACKGROUND OF THE INVENTION (1) Field of the Invention

This invention relates to a wide angle frequency automatic scanning ultrasonic chaser for scaring away straying animals such as cats and dogs and particularly to an ultrasonic animal chaser which is simply structured and offers automatic scanning frequency.

(2) Description of the Prior Art

Straying cats and dogs is an annoying problem to many households.

Among the many means now available that can chase away the straying cats and dogs, the chaser that uses supersonic high frequency is widely considered most effective. It also does not create pollution problem. Therefore there is a growing demand for this type of chaser.

SUMMARY OF THE INVENTION

It is an object of this invention to provide a supersonic chaser that employs a divider and a stable multivibrator circuit to generate automatic frequency scanning ultrasonic oscillation for achieving more powerful chasing effect and saving energy consumption.

It is another object of this invention to provide a chaser that is simply structured and is easy to assemble and use. This invention also provides a water resistant cover to enable it be used outdoors.

BRIEF DESCRIPTION OF THE DRAWINGS

The invention, as well as its many advantages, may be further understood by the following detailed description and drawings in which.

DESCRIPTION OF THE PREFERRED EMBODIMENT

Figure 1:
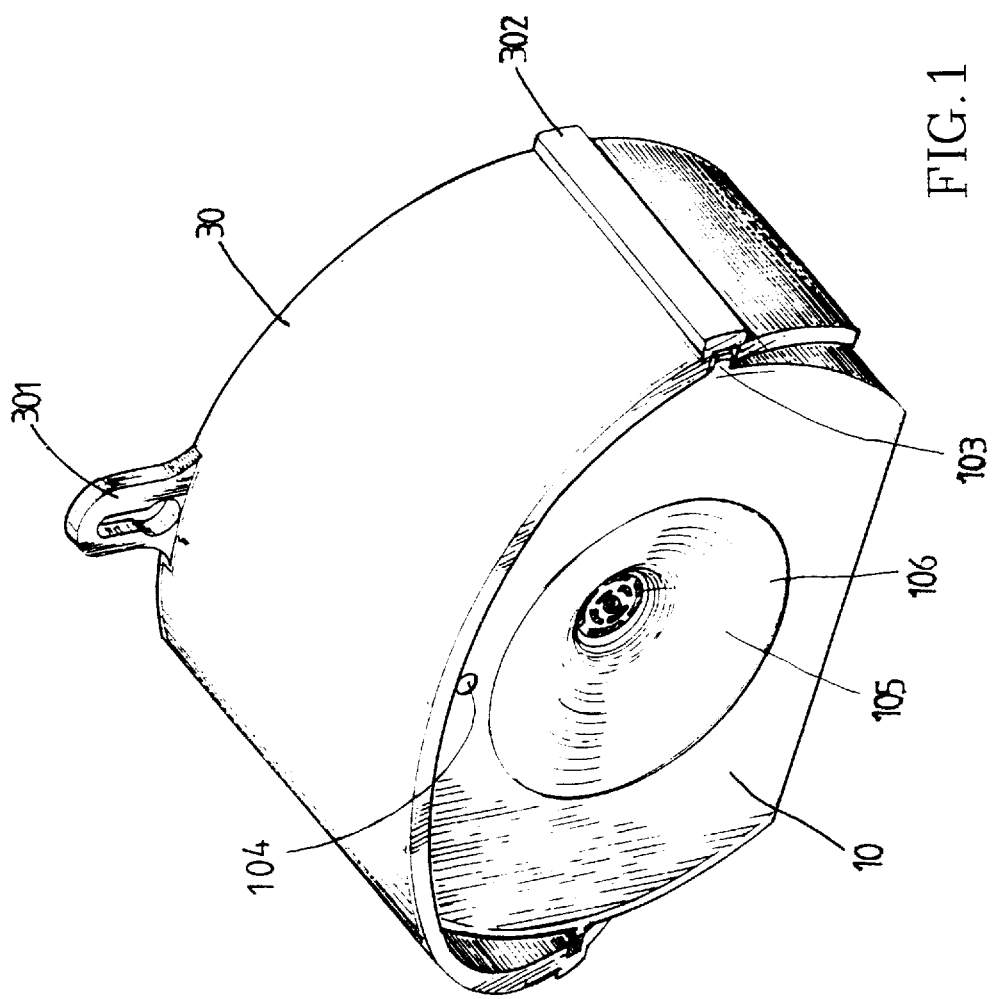
FIG. 1 is a perspective view of this invention.
Figure 2:
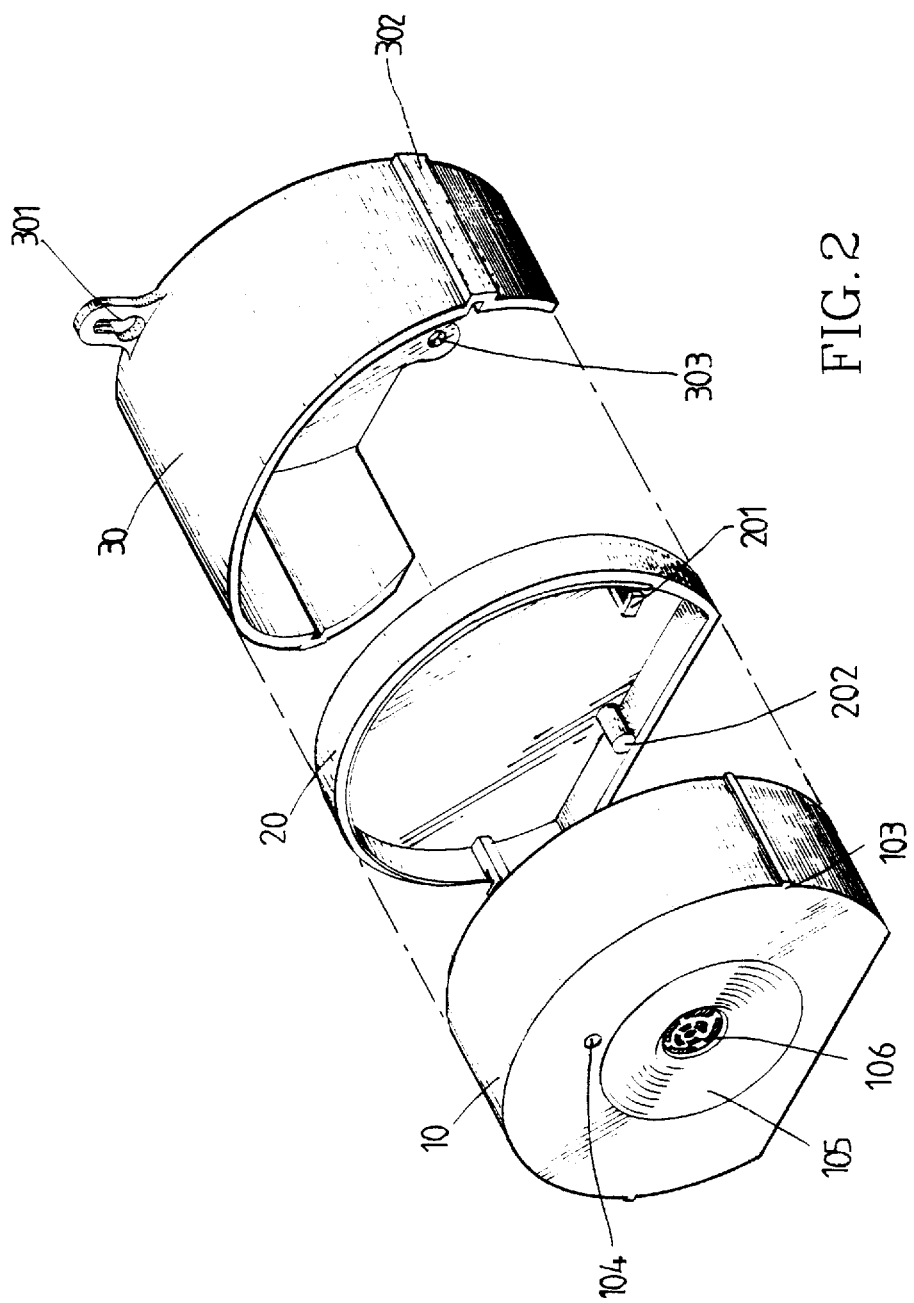
FIG. 2 is an exploded view of this invention.
Figure 3:
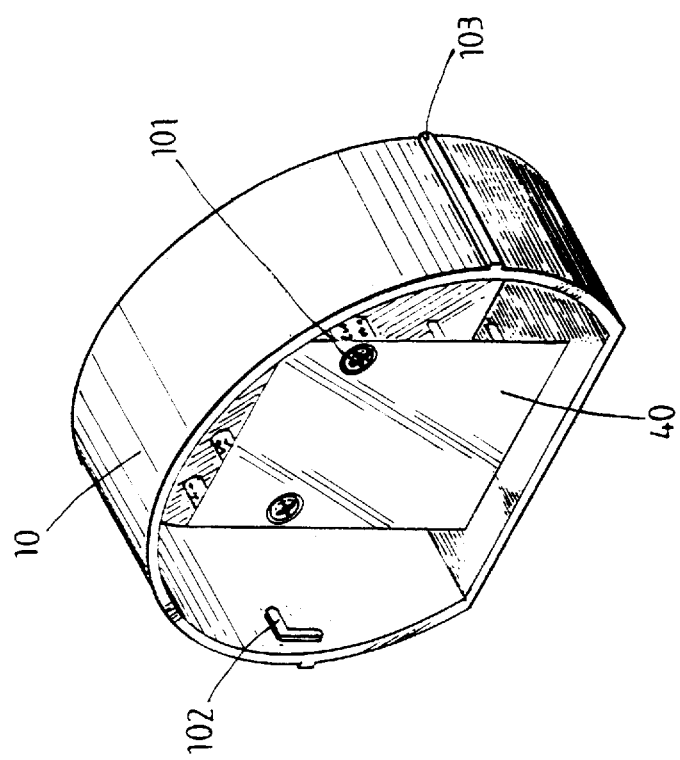
FIG. 3 is a perspective view of a case of this invention.

Referring to FIG. 1, 2 and 3, this invention includes a case 10, an end plate 20, a cover 30 and a supersonic oscillation circuit 40. The case 10 formed like a hollow tube with a closed front end which has a conical concave center 105, a signal light aperture 104 above the concave center, two lateral ridges 103 on outside wall, and an open rear end. In the concave center 105, there is a perforated plate 106 to facilitate supersonic frequency emission.

At the two lateral inside walls, there are a pair of L shape grooves 102 and a pair of screw seats (not shown in the figures) for holding the supersonic oscillation circuit 40 thereon by means of screws 101. The case 10 has a flat bottom wall and a power plug (not shown) connectable to a power supply.

The end plate 20 shaped like a shallow disk has two lateral hooks 201 engageable with the L shape grooves 102 and a stud 202. Thus the end plate 20 may be engaged with the case 10 through the open end tightly. The cover 30 has a hanging lug 301, a screw hole 303 and two lateral troughs 302 engageable with the ridges 103. Thus the cover 30 may house the case 10 and the end plate 20 therein securely to form a completed and water resistant unit.

The unit may be fixed to a wall through the screw hole 303 or be hung on a nail via the hanging lug 301. As the unit is assembled together by engaging the hooks 201 with the L shape grooves 102, and the ridges 103 with the troughs 302, it can be done easily without even a hand tool.

Figure 4:
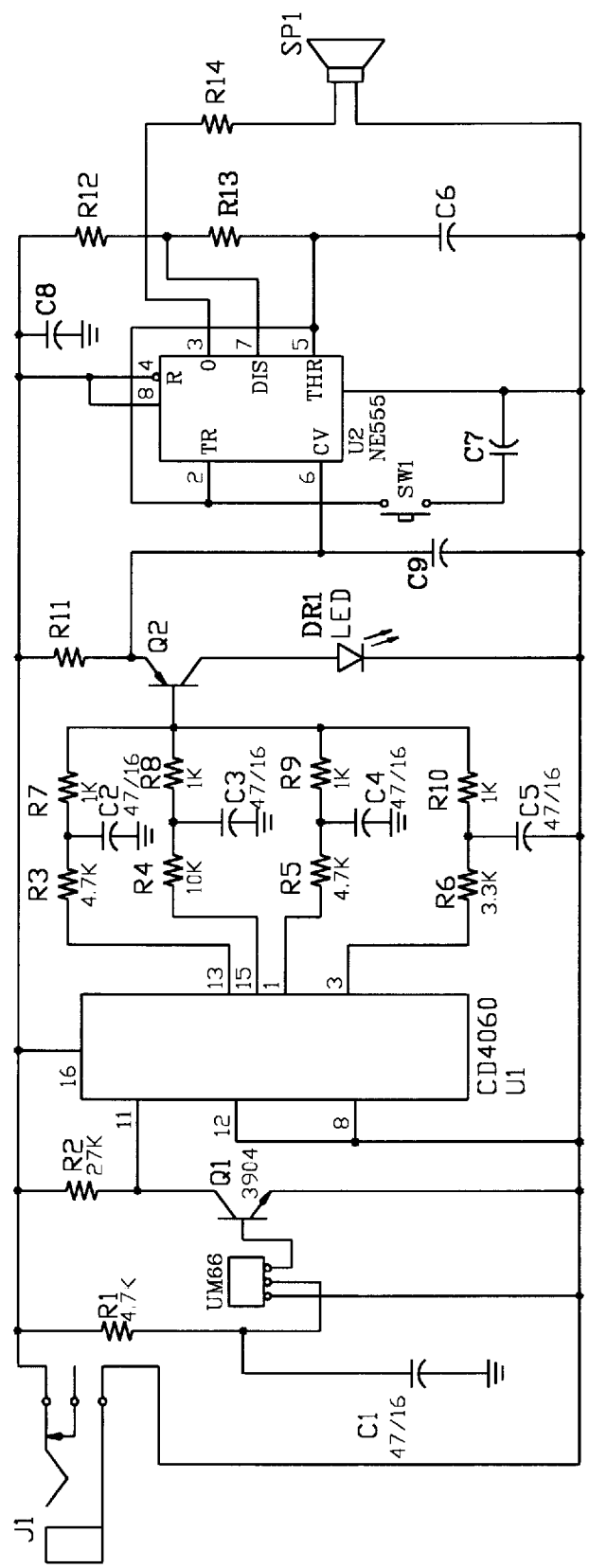
FIG. 4 is a circuit diagram of this invention.
Figure 5:
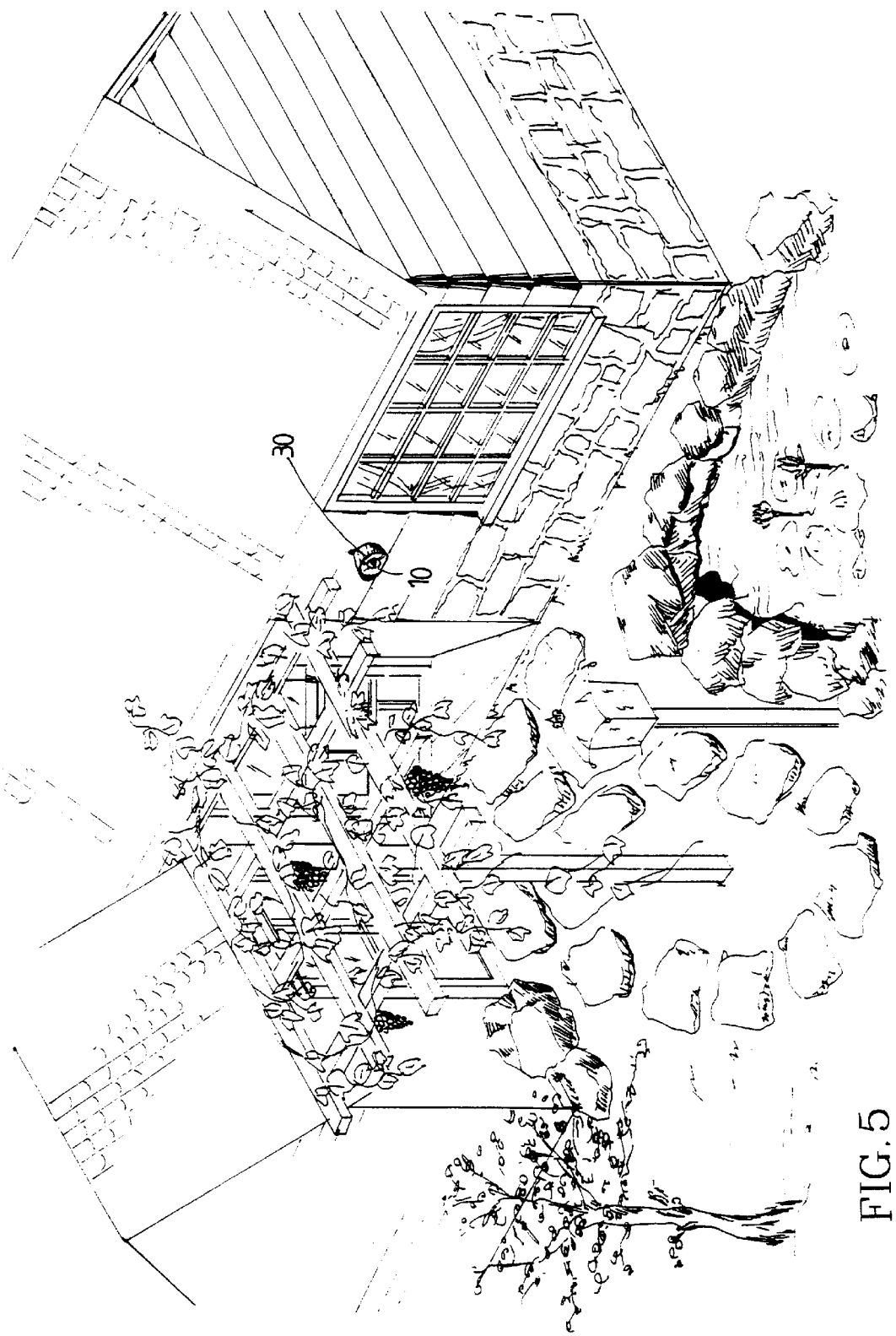
FIG. 5 is a pictorial view showing this invention in use.

FIG. 4 illustrates a circuit diagram of this invention. External power supply comes from a switch J1, goes to a limiting circuit which consisting of a resistor R1 and a capacitor C1, then transmits to a random signal generator UM66. UM66 then outputs random signals to a transistor Q1 which amplifies the signals and transmits to a divider U1(CD4060). The outputs of the divider being transmitted to an integral/differential circuit to produce random linear signals. There are four sets of integral/differential circuit to receive the random signals of different frequency from output terminals of the divider. The outputs of the integral/differential circuits go together to a transistor Q2 for amplification and becomes a trigger signal for triggering an oscillator U2(NE555). U2 couples with resistors R12, R13 and a capacitor C6 to form an oscillation circuit which can generate a high frequency random signal, which in turn go to a speaker SP1 to produce high frequency audio wave for scaring away straying cats and dogs nearby. A signal light DR1 located in the signal light aperture 104 indicates operation condition.

The structure set forth above is simple and consists of a small number of parts. It is easy to assemble and put to use.

What is claimed is:

1. A wide angle frequency automatic scanning ultrasonic animal chaser for scaring away straying cats and dogs, comprising:

a case formed like a hollow tube having a closed front end, an open rear end, a flat bottom, a pair of ridges on two lateral outside walls, and two L shape grooves on two lateral inside walls; the front end having a concave center with a perforated plate disposed therein, a signal light aperture located above the concave center and a pair of spaced screw seats mounted on an inside wall thereof for holding an ultrasonic oscillation circuit board;

an end plate housed within the case having a pair of hooks engageable with the L shape grooves and a stud at a bottom;

a water resistant cover having a hanging lug at one end, a screw hole in an end wall, and a pair of troughs on two lateral walls engageable with the ridges for housing the case and the end plate therein; and an ultrasonic oscillation circuit including a random signals generator for generating a random signals, a divider having an input terminal for receiving the random signals and output terminals wiring to a plural number of integral and differential circuits for linear signal processing, an amplifying transistor for receiving amplifying signals coming from the integral and differential circuits for transferring; and an oscillation circuit controlled by the amplifying transistor for generating oscillation frequency to a speaker to produce high frequency random audio signals.

* * * * *